(12) United States Patent
Sawai et al.

(10) Patent No.: US 6,284,811 B1
(45) Date of Patent: Sep. 4, 2001

(54) LOW VISCOSITY POLYESTER-POLYOLS AND POLYURETHANE FOAMS PREPARED THEREFROM

(75) Inventors: Minoru Sawai; Makoto Okubo; Kenichi Miyamoto; Kazunari Takemura; Masahiro Mori, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/508,454

(22) PCT Filed: Sep. 9, 1998

(86) PCT No.: PCT/JP98/04091

§ 371 Date: May 17, 2000

§ 102(e) Date: May 17, 2000

(87) PCT Pub. No.: WO99/12988

PCT Pub. Date: Mar. 18, 1999

(30) Foreign Application Priority Data

Sep. 11, 1997 (JP) .................................................. 9-247083

(51) Int. Cl.[7] .................................................. C08G 18/14
(52) U.S. Cl. .......................... 521/159; 521/172; 521/173; 528/80; 528/83; 560/25; 560/26; 560/76; 560/91; 560/115; 560/158; 560/330; 560/336
(58) Field of Search .................................. 560/76, 91, 25, 560/26, 115, 158, 330, 336; 521/172, 173, 159; 528/80, 83

(56) References Cited

U.S. PATENT DOCUMENTS

| | | |
|---|---|---|
| 4,247,678 | 1/1981 | Chung . |
| 4,937,307 | 6/1990 | Chung . |
| 5,219,893 * | 6/1993 | Konig et al. ........................ 521/173 |
| 5,373,029 * | 12/1994 | Naujoks et al. .................... 521/172 |

FOREIGN PATENT DOCUMENTS

| | | |
|---|---|---|
| 2176726 | 4/1986 | (EP) . |
| 2278412 | 8/1988 | (EP) . |
| 63128017 | 5/1988 | (JP) . |
| 8325346 | 12/1996 | (JP) . |
| 9730100 | 8/1997 | (WO) . |

OTHER PUBLICATIONS

Japanese Abstract: JP 60110718, (Jun. 1985).

* cited by examiner

*Primary Examiner*—John M. Cooney, Jr.
(74) *Attorney, Agent, or Firm*—Birch, Stewart, Kolasch & Birch, LLP

(57) ABSTRACT

A polyester-polyol being liquid at 40° C. and having a viscosity of not more than 10,000 mPa·s at 60° C., prepared by polycondensation of an acid component including at least one phthalic acid component selected from phthalic anhydride and o-phthalic acid, and an aliphatic polybasic acid, with a polyhydric alcohol; a process for preparing a polyurethane foam including reacting a polyisocyanate component with a polyol component including the polyester-polyol; a process for preparing an isocyanate prepolymer from a polyisocyanate component and a polyol component including the polyester-polyol; and a process for preparing a polyurethane foam including reacting an isocyanate prepolymer prepared from a polyisocyanate component and a polyol component including the polyester-polyol, with a polyol component. The resulting polyurethane foam shows remarkably improved physical properties such as tensile strength and tear strength, while having low density, acceptable appearance and texture.

7 Claims, No Drawings

LOW VISCOSITY POLYESTER-POLYOLS AND POLYURETHANE FOAMS PREPARED THEREFROM

This application is the national phase under 35 U.S.C. §371 of PCT International Application No. PCT/JP98/04091 which has an International filing date of Sep. 9, 1998, which designated the United States of America.

TECHNICAL FIELD

The present invention is directed to a process for preparing a polyurethane foam. More specifically, the present invention is directed to a process for preparing a polyurethane foam which has high mechanical strength and can be suitably used as shoe soles, to a process for preparing an isocyanate prepolymer used as a starting material of the polyurethane foam, and to a polyester-polyol used as a starting material of the polyurethane foam.

BACKGROUND ART

When preparing a polyurethane foam, it is desirable that the density of the polyurethane foam to be decreased, because the cost of preparing becomes less. However, the mechanical strength of the polyurethane foam is lowered when its density is decreased because the amount of a resin per unit volume is reduced.

In order to improve the mechanical strength of the polyurethane foam, there has been proposed to use additives such as a cross-linking agent, a polyfunctional polyol and an aromatic polyol together with the starting polyol.

The above proposal, however, has some problems. That is, the use of the cross-linking agent and the polyfunctional polyol in the preparation of an isocyanate prepolymer tends to cause gelation. Also, when a prepolymer which is made from the aromatic polyol is used as a starting material for a polyurethane foam, it is difficult to adjust the viscosity and melting point of the prepolymer to a level suitable for the preparation of a polyurethane foam because the aromatic polyol has a remarkably high viscosity and a high melting point.

One object of the present invention is to provide a process for preparing a polyurethane foam which has a low density, acceptable appearance and texture, and excellent mechanical strength, such as tensile strength and tear strength.

The above and other objects of the present invention will be apparent from the following description.

DISCLOSURE OF INVENTION

The present invention is directed to:
(1) a polyester-polyol being liquid at 40° C. and having a viscosity of not more than 10,000 mPa·s at 60° C., prepared by polycondensation of:
   (A) an acid component comprising at least one phthalic acid component selected from phthalic anhydride and o-phthalic acid, and an aliphatic polybasic acid, with
   (B) a polyhydric alcohol;
(2) a process for preparing a polyurethane foam comprising reacting a polyisocyanate component with a polyol component comprising the polyester-polyol according to item (1) to foam; to produce a polyurethane foam;
(3) a process for preparing an isocyanate prepolymer which comprises reacting (a) a polyol comprising a polyester-polyol being liquid at 40° C. and having a viscosity of not more than 10,000 mPa·s at 60° C., prepared by polycondensation of (A) an acid component comprising at least one phthalic acid component selected from phthalic anhydride and o-phthalic acid, and an aliphatic polybasic acid, with (B) a polyhydric alcohol; with (b) a polyisocyanate; and
(4) a process for preparing a polyurethane foam comprising reacting an isocyanate prepolymer prepared according to the process of item (3) with a polyol component to foam; to produce a polyurethane foam.

BEST MODE FOR CARRYING OUT THE INVENTION

The polyester-polyol of the present invention is useful as a starting material for preparing a polyurethane foam.

The polyester-polyol of the present invention is prepared by the polycondensation of:
   (A) an acid component comprising at least one phthalic acid component selected from phthalic anhydride and o-phthalic acid, and an aliphatic polybasic acid; with
   (B) a polyhydric alcohol.

As the phthalic acid component, at least one phthalic acid component selected from phthalic anhydride and o-phthalic acid is used. Therefore, phthalic anhydride and o-phthalic acid may be used alone or in admixture thereof.

Aliphatic polybasic acids include, for example, saturated aliphatic dicarboxylic acids such as oxalic acid, malonic acid, succinic acid, glutaric acid, adipic acid, pimelic -acid, suberic acid, azelaic acid, sebacic acid, nonamethylenedicarboxylic acid, decamethylenedicarboxylic acid, undecamethylenedicarboxylic acid, dodecamethylenedicarboxylic acid, tridecamethylenedicarboxylic acid, tetradecamethylenedicarboxylic acid, pentadecamethylenedicarboxylic acid, hexadecamethylenedicarboxylic acid, heptadecamethylenedicarboxylic acid, octadecamethylenedicarboxylic acid, nonadecamethylenedicarboxylic acid, eicosamethylenedicarboxylic acid, heneicosamethylenedicarboxylic acid, docosamethylenedicarboxylic acid, tetracosamethylenedicarboxylic acid, octacosamethylenedicarboxylic acid, and dotriacontamethylenedicarboxylic acid. The aliphatic polybasic acids can be used alone or in admixture thereof. Among them, adipic acid can be favorably used from the viewpoints of providing a polyurethane foam having excellent hydrolysis resistance and excellent tensile strength in good balance, having high safety and being inexpensive.

The acid component comprises a phthalic acid component and-an aliphatic polybasic acid. With respect to the acid component, the term "comprising" means that the acid component is composed of the phthalic acid component and the aliphatic polybasic acid, or may contain other acid components than the phthalic acid component and the aliphatic polybasic acid, so long as the other acid components do not hinder the achievement of the object of the present invention. Other acid components include, for example, unsaturated aliphatic dicarboxylic acids such as maleic acid, fumaric acid and itaconic acid; halogen-containing dicarboxylic acids such as tetrabromophthalic acid; phthalic acid derivatives represented by the formula:

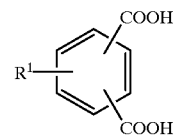

wherein $R^1$ is an alkyl group having 1 to 4 carbon atoms; an aryl group having 6 to 12 carbon atoms; an aralkyl group having 7 to 13 carbon atoms; a halogen atom; an alkoxy group having 1 to 4 carbon atoms; hydroxyl group; or an aryloxy group having 6 to 12 carbon atoms which may have a substituent;
terephthalic acid; isophthalic acid; naphthalene derivatives represented by the formula:

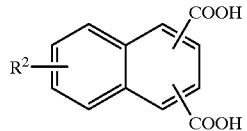

wherein $R^2$ is hydrogen atom, an alkyl group having 1 to 4 carbon atoms; an aryl group having 6 to 12 carbon atoms, an aralkyl group having 7 to 13 carbon atoms; a halogen atom; an alkoxy group having 1 to 4 carbon atoms; hydroxyl group; or an aryloxy group having 6 to 12 carbon atoms which may have a substitutent. The present invention is not limited to the exemplified ones.

The content of other acid components is preferably not more than 10% by weight, more preferably not more than 5% by weight, and it is most desirable that the acid component be composed of the phthalic acid component and the aliphatic polybasic acid.

With respect to the acid component, it is desired that the molar ratio of the phthalic acid component/aliphatic polybasic acid is adjusted to not less than 0.05, preferably not less than 0.08, in order to avoid that the solidification point of the acid component does not become too high, and that the acid component is liquid under employed molding conditions (molding temperature: about 40° C.). Also, it is desired that the molar ratio is adjusted to not more than 0.2, preferably not more than 0.15, from the viewpoint of easy injection and pouring during molding. When the polyester-polyol is included in the polyol component used in the preparation of a polyurethane foam, it is desired that the molar ratio of the phthalic acid component/aliphatic polybasic acid is not more than 0.15, preferably not more than 0.12.

The polyhydric alcohol includes, for example, ethylene glycol, propylene glycol, 1,3-propanediol, 1,4-propanediol, 1,4-butanediol, 1,5-pentanediol, neopentyl glycol, 1,6-hexanediol, 1,7-heptanediol, 1,8-octanediol, 1,9-nonanediol, 1,10-decanediol, and the like. Those polyhydric alcohols can be used alone or in admixture thereof. Among them, ethylene glycol and 1,4-butanediol can be suitably used in order to obtain a polyurethane foam having excellent physical properties such as tensile strength. Either ethylene glycol or 1,4-butanediol can be used singularly or in admixture thereof.

The polyester-polyol of the present invention is obtained by the polycondensation of the acid component with the polyhydric alcohol.

It is stoichiometrically desired that the ratio of the acid component to the polyhydric alcohol be adjusted so that the equivalent ratio of COOH group of the acid component to OH group of the polyhydric alcohol [COOH/OH] is slightly less than 1, so that the polycondensation reaction results in a polyester-polyol having hydroxyl groups at both terminals.

The process for polycondensation of the acid component with the polyhydric alcohol is not particularly limited, so long as conventional processes used in the preparation of polyesters are employed, such as those disclosed in *"Polyurethane Handbook,"* edited by Günter Oertel, 2nd Edition, Hanser Publishers (1994), 65–72.

As the polyester-polyol resulting from the polycondensation of the acid component with the polyhydric alcohol, there can be used a polyester-polyol being liquid at 40° C. and having a viscosity of not more than 10,000 mPa·s at 60° C.

The reason why the polyester-polyol being liquid at 40° C. is used is that the controlling temperature of the starting material tank and that of the starting material circulation in conventional automatic mixing and injecting foaming machines are around 40° C. Here, the phrase "being liquid at 40° C." means that the polyester-polyol has fluidity at 40° C., i.e. the polyester-polyol has a viscosity of not more than 20,000 mPa·s at 40° C.

The reason why the viscosity of the polyester-polyol is adjusted to not more than 10,000 Mpa·s, preferably not more than 3,000 mPa·s, at 60° C. is to improve the injection moldability when molding a polyurethane foam and to stably inject the polyester-polyol.

The viscosity is measured by Brookfield viscosity meter, which is one of rotating viscosity meters, after the measurement system becomes stable.

It is desired that the number-average molecular weight of the polyester-polyol be between 500 to 4,000, preferably 500 to 3,500, more preferably 500 to 3,000, most preferably 1,000 to 2,500, from the viewpoint of its viscosity and melting point.

The resulting polyester-polyol can be appropriately used as a starting material for the preparation of a polyurethane foam.

One of major characteristics of the process for preparing a polyurethane foam of the present invention resides in that the polyester-polyol described above is used in the process. The polyester-polyol imparts excellent mechanical strength to the resulting polyurethane foam.

There are two major embodiments in the process for preparing a polyurethane foam using the polyester-polyol, which are as follows:

(1) reacting a polyisocyanate component; with a polyol component to foam, wherein the polyol component comprises the polyester-polyol (hereinafter referred to as Process I); and (2) reacting an isocyanate prepolymer resulting from a polyisocyanate component and a polyol component; with a polyol component to foam, wherein the polyol component used in the preparation of the isocyanate prepolymer comprises the polyester-polyol (hereinafter referred to as Process II).

First, Process I is described below.

In Process I, as a polyol component usable in the reaction of the polyisocyanate component with the polyol component, those comprising the polyester-polyol as described in detail above are used.

As the polyol component, there can also be used polyester-polyols, such as a polyester-polyol obtained by polycondensing at least one of polyhydric alcohols such as ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, dextrose and sorbitol, and at least one dibasic acid such as oxalic acid, malonic acid, succinic acid, adipic acid, sebacic acid and a dimer acid; a polypropylene glycol; a polyether-polyol such as polyoxytetramethylene glycol; a polycaprolactone polyol; and a polycarbonate polyol. Polyols can be used singularly or in admixture thereof.

In order to maintain a favorable liquid state and viscosity and to prepare a polyurethane foam having excellent mechanical strength, it is desired that the content of the polyester-polyol in the above polyol component is 10 to 95% by weight, preferably 20 to 90% by weight, more preferably 40 to 90% by weight.

The above polyol component may optionally contain auxiliaries such as chain extenders, blowing agents, urethane promoting catalysts, cell regulators such as surfactants, stabilizers and pigments in a proper amount.

As chain extenders, low molecular compounds having 2 or more active hydrogens in its molecule can be used. Typical examples of the chain extenders include polyhydric alcohols such as ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, dextrose and sorbitol; aliphatic polyamines such as ethylenediamine and hexamethylenediamine; aromatic polyamines; alkanolamines such as diethanolamine, triethanolamine and diisopropanolamine, and the like. The chain extenders can be used singularly, or in admixture thereof.

Examples of blowing agents are, for example, water, fluorocarbons, and the like. The blowing agents can be used singularly, or in admixture thereof.

Examples of urethane promoting catalysts are, for example, tertiary amines such as triethylenediamine, N,N,N',N'-tetramethylhexamethylenediamine and 1,2-dimethylimidazole; and tin compounds such as tin (II) octanoate and dibutyltin dilaurate. The urethane promoting catalysts can be used singularly, or in admixture thereof.

Examples of cell regulators are, for example, silicone surfactants such as dimethylpolysiloxane, polyoxyalkylene polyol-modified dimethylpolysiloxane and alkylene glycol-modified dimethylpolysiloxane; and anionic surfactants such as salts of fatty acids, salts of sulfuric acid esters, salts of phosphoric acid esters and sulfonates. The cell regulators can be used singularly, or in admixture thereof.

Examples of stabilizers are, for example, hindered phenol radical scavengers such as dibutylhydroxytoluene, pentaerythrityl-tetrakis[3-(3,5-di-t-butyl-4-hydroxyphenyl) propionate] and isooctyl-3-(3,5-di-t-butyl-4-hydroxyphenyl)propionate; antioxidants such as phosphorous acid compounds such as phosphorous acid, triphenylphosphite, triethylphosphite and triphenylphosphine; ultraviolet absorbents such as 2-(5-methyl-2-hydroxyphenyl)benzotriazole and a condensation product of methyl-3-[3-t-butyl-5-(2H-benzotriazol-2-yl)-4-hydroxyphenyl]propionate and polyethylene glycol. The stabilizers can be used singularly, or in admixture thereof.

Examples of pigments are, for example, inorganic pigments typically represented by transition metal salts; organic pigments typically represented by azo compounds; and carbon powder. The pigments can be used singularly, or in admixture thereof.

The polyol component thus obtained is liquid at room temperature and injectable even at a low pressure. Thus, a polyurethane foam can be readily obtained by reacting the polyol component with a polyisocyanate component as described below.

Representative examples of the polyisocyanate component usable in Process I are, for example, isocyanate prepolymers.

The isocyanate prepolymer can be obtained by a conventional method comprising stirring and thereby allowing to react an excess polyisocyanate monomer with a polyol.

Polyisocyanate monomers are, for example, polyisocyanate compounds such as tolylene diisocyanate, m-phenylene diisocyanate, p-phenylene diisocyanate, xylylene diisocyanate, 4,4'-diphenylmethane diisocyanate, hexamethylene diisocyanate, isophorone diisocyanate, polymethylenepolyphenyl diisocyanate, 3,3'-dimethyl-4,4'-biphenylene diisocyanate, 3,3'-dimethyl-4,4'-diphenylmethane diisocyanate, 3,3-dichloro-4,4'-biphenylene diisocyanate, 1,5-naphthalene diisocyanate, and modified compounds thereof such as carbodiimide-modified compounds thereof, which can be used singularly, or in admixture thereof. Among them, single use of 4,4'-diphenylmethane diisocyanate or the combined use of 4,4'-diphenylmethane diisocyanate and a carbodiimide-modified 4,4'-diphenylmethane diisocyanate is particularly preferred.

Examples of the polyol include, for example, a polyester-polyol obtained by polycondensation of at least one of polyhydric alcohols such as ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, dextrose and sorbitol, and at least one of dibasic acids such as oxalic acid, malonic acid, succinic acid, adipic acid, sebacic acid and a dimer acid; a polypropylene glycol; a polyether-polyol such as polyoxytetramethylene glycol; a polycaprolactone polyol; and a polycarbonate polyol. Those can be used singularly, or in admixture thereof.

If necessary, various auxiliaries may be used in the preparation of the isocyanate prepolymer.

As the above auxiliaries, there can be used, for example, in addition to the auxiliaries used in the preparation of the above polyester-polyol, inhibitors for self-polymerization of the isocyanate prepolymer, including acid gases such as hydrogen chloride gas and sulfur dioxide gas, acid chlorides such as acetyl chloride, benzoyl chloride and isophthalic acid chloride, phosphoric acid compounds such as phosphoric acid, monoethyl phosphate and diethyl phosphate. The auxiliaries can be used singularly, or in admixture thereof.

It is desired that the content of NCO in the isocyanate prepolymer is not less than 15%, preferably not less than 17%, in order to avoid undesirably high viscosity which results in difficulties in molding with a low pressure blowing machine, and that the content of NCO in the isocyanate prepolymer is not more than 25%, preferably not more than 23%, more preferably not more than 22%, in order to avoid undesirably low viscosity which results in poor measuring accuracy of a foaming machine.

The above isocyanate prepolymer is liquid at a temperature of not lower than 15° C., and injectable even at a low pressure. Thus, there is no problem when the isocyanate prepolymer is used for the preparation of a polyurethane foam at a molding temperature, for example, at 40° to 50° C.

In Process I, when the polyisocyanate component is reacted with the polyol component, both components are preferably blended in such a ratio that the isocyanate index becomes 95 to 105.

In Process I, a polyurethane foam can be obtained by mixing and stirring the polyol component and the polyisocyanate component, injecting the resulting mixture into a mold, and allowing the mixture to foam by means of a molding machine. Specifically, for example, the polyol component is usually heated up to about 40° C. using a tank and allowed to react with the polyisocyanate component using a foaming machine such as an automatically mixing and injecting foaming machine or an automatically blending and injecting foaming machine to form a polyurethane foam.

Also, according to Process I, the polyisocyanate component and the polyol component are blended together, and the resulting mixture is then molded into a urethane foam useful in shoe sole applications by means of a foaming machine the temperature of which is usually adjusted to about 40° to about 50° C.

Process I can be employed for the preparation of non-expanded elastomer products. When this process is employed for the production of a shoe sole, the process imparts improvements in mechanical strength such as tensile strength and tear strength to the resulting polyurethane foam while the density is decreased.

Secondly, Process II is described below.

In Process II, a polyurethane foam is prepared by reacting an isocyanate prepolymer prepared from a polyisocyanate component and a polyol component; with a polyol component, wherein the polyol component used in the preparation of the isocyanate prepolymer comprises a polyester-polyol liquid at 40° C. and having a viscosity of not more than 10,000 mPa·s at 60° C., prepared by polycondensation of (A) an acid component comprising at least one phthalic acid component selected from phthalic anhydride and o-phthalic acid, and an aliphatic polybasic acid, with (B) a polyhydric alcohol.

When the acid component is used in the preparation of the isocyanate prepolymer, from the viewpoint of easy handling of the isocyanate prepolymer, it is desired that the molar ratio of the phthalic acid component/aliphatic polybasic acid is not more than 0.55, preferably not more than 0.3, more preferably not more than 0.2, and not less than 0.05, preferably not less than 0.08.

As the polyisocyanate component which is a starting material of the isocyanate prepolymer, there can be cited, for instance, the polyisocyanate monomers which can be employed in Process I.

Concrete examples of the polyisocyanate monomers include the same as those exemplified in Process I. Among them, single use of 4,4'-diphenylmethane diisocyanate or the combined use of 4,4'-diphenylmethane diisocyanate and a carbodiimide-modified 4,4'-diphenylmethane diisocyanate is particularly preferred.

The polyol component, which is a starting material of the isocyanate prepolymer, comprises the aforementioned polyester-polyol.

In Process II, since the use of the above polyester-polyol permits maintaining the viscosity of the resulting isocyanate prepolymer at an appropriate level, this process can impart excellent mechanical strength to the resulting polyurethane foam.

Here, the phrase "comprising the polyester-polyol" means that the polyol component is composed only of the polyester-polyol, or may also contain polyol components other than the polyester-polyol.

Examples of polyol other than the above polyester-polyol are, for instance, the same polyols as those used in Process I.

It is desired that the content of the polyester-polyol in the polyol component is 10 to 100% by weight, preferably 50 to 100% by weight.

In Process II, it is desired that the ratio of the polyisocyanate component to the polyol component is adjusted such that the equivalent ratio of NCO group/OH group is usually about 5 to about 30.

In the preparation of an isocyanate prepolymer, auxiliaries such as self-polymerization inhibitors, antioxidants and ultraviolet absorbents may be optionally used.

Examples of the self-polymerization inhibitors can be the same as those used in the preparation of the isocyanate prepolymer in Process I.

Examples of the antioxidants and ultraviolet absorbents can be the same as those added to the polyol component in Process I.

Next, an isocyanate prepolymer can be obtained by stirring and reacting the polyisocyanate component, the polyol component and optionally auxiliaries.

It is desired that the content of NCO in the resulting isocyanate prepolymer is not less than 12%, preferably not less than 14% in order to avoid undesirably high viscosity which causes difficulties in molding with a low-pressure foaming machine, and that the content of NCO in the resulting isocyanate prepolymer is not more than 25%, preferably not more than 23%, more preferably not more than 22%, in order to avoid undesirably low viscosity which results in poor measuring accuracy of a foaming machine.

The isocyanate prepolymer is liquid at a temperature of not lower than 15° C., and injectable even at a low pressure. Thus, there is no problem when the isocyanate prepolymer is used for the preparation of a polyurethane foam at a molding temperature, for example, at 40° to 50° C.

Next, a polyurethane foam can be prepared by reacting the isocyanate prepolymer with the polyol component.

Examples of the polyol component usable in the reaction with the isocyanate prepolymer can be the same as the polyol component usable in Process I except for the polyester-polyol.

To the polyol component usable in the reaction with the isocyanate prepolymer, auxiliaries such as chain extenders, blowing agents, urethane promoting catalysts, stabilizers and pigments may optionally be added in appropriate amounts. Examples of the auxiliaries can be the same as those added to the polyol component usable in Process I.

In Process II, in the reaction of the polyisocyanate component with the polyol component, it is desired that the polyisocyanate component and the polyol component are blended in a ratio such that the isocyanate index is adjusted to 95 to 105.

In Process II, a polyurethane foam can be obtained by mixing and stirring the isocyanate prepolymer, the polyol component and optionally appropriate auxiliaries, injecting the resulting mixture into a mold, and allowing the mixture to foam by means of a molding machine. More specifically, for example, the polyol component is usually heated up to about 40° C. using a tank and allowed to react with the isocyanate prepolymer using a foaming machine such as an automatic mixing and injecting foaming machine or an automatic blending and injecting foaming machine to form a polyurethane foam.

Also, according to Process II, the isocyanate prepolymer and the polyol component are blended together in advance, and the resulting mixture is molded into a urethane foam useful for shoe sole applications by means of a foaming machine, the temperature of which is usually adjusted to about 40° to about 50° C.

Process II can be employed for the preparation of non-expanded elastomer products. When this process is employed for the production of a shoe sole, the process improves mechanical strength such as tensile strength and tear strength of the resulting polyurethane foam, while the density is decreased.

It is practically desired that the density of the polyurethane foams prepared by Process I and Process II is 0.15 to 1.0 g/cm$^3$, preferably 0.2 to 0.6 g/cm$^3$, more preferably 0.2 to 0.4 g/cm$^3$, from the viewpoints of sufficient mechanical strength and low density.

In the following working examples, the term "parts" means 'parts by weight' in all cases.

PREPARATION EXAMPLE 1 To 3

Preparation of Polyester-Polyols A to C

A four-necked flask was charged with 100 parts of adipic acid, a phthalic acid component (phthalic anhydride or o-phthalic acid), and a glycol (ethylene glycol or 1,4-butanediol), the amounts of the phthalic acid component and the glycol being shown in Table 1, and the flask was equipped with a stirring rod, a dehydration tube, a nitrogen inlet tube and a thermometer.

Then, nitrogen gas was introduced into the flask, and water generated was distilled off. The content of the flask was heated up to 220° C.

After the transparency of the reaction mixture in the flask was confirmed, the pressure in the flask was gradually reduced for further distilling off of water.

The reaction was continued until the acid value of the resulting reaction mixture became not more than 1 KOH mg/g, to yield each of Polyester-Polyols A to C, showing liquid at 40° C.

Acid value, hydroxyl value, viscosity, solidification point and number-average molecular weight were determined as the physical properties of the resulting Polyester-Polyols A to C. The results are shown in Table 1.

The above measurements were carried out according to the following methods: acid value was determined by JIS K 0070; hydroxyl value, JIS K 0070; viscosity, JIS Z 8803 (by the use of Brookfield viscosity meter); and solidification point, JIS K 0065. The number-average molecular weight was calculated from the hydroxyl value.

TABLE 1

|  | Preparation Example Nos. | | |
| --- | --- | --- | --- |
|  | 1 | 2 | 3 |
| Phthalic Acid Component | | | |
| Phthalic Anhydride (Parts) | 11.2 | 11.2 | — |
| o-Phthalic Acid (Parts) | — | — | 12.6 |
| Glycol | | | |
| Ethylene Glycol (Parts) | 51.1 | — | 51.1 |
| 1,4-Butanediol (Parts) | — | 75.2 | — |
| Phthalic Acid Component/Adipic Acid (Molar Ratio) | 0.11 | 0.11 | 0.11 |
| Polyester-Polyol | | | |
| Kind of Polyester-Polyol | A | B | C |
| Acid Value (KOH mg/g) | 0.2 | 0.65 | 0.3 |
| Hydroxyl Value (KOH mg/g) | 52.7 | 50.9 | 51.8 |
| Viscosity (mpa · s) at 60° C. | 2300 | 2900 | 2290 |
| Solidification Point (° C.) | 25–28 | 25–28 | 25–28 |
| Number-Average Molecular Weight | 2130 | 2205 | 2166 |

PRODUCTION EXAMPLES 1 TO 3

Preparation of Polyol Components A to C

There were mixed together 40 parts of Polyester-Polyol A, B or C obtained in Preparation Example 1, 2 or 3 as shown in Table 2, 60 parts of a polyester-polyol [starting monomers: ethylene glycol, 1,4-butanediol and adipic acid; ethylene glycol/1,4-butanediol (weight ratio)=1/1; number-average molecular weight: 1,300], 11 parts of ethylene glycol as a chain extender, 1.05 parts of water as a blowing agent, 0.8 parts of triethylenediamine as a catalyst and 1 part of a silicone cell regulator, and agitated with heating to a temperature of 60° C., to give Polyol Components A to C.

As the physical properties of Polyol Components A to C, acid value, hydroxyl value and viscosity were determined in the same manner as in Preparation Example 1, and water content was determined in accordance with JIS K 0068. The results are shown in Table 2.

PRODUCTION EXAMPLE 4

Preparation of Polyol Component D

There were mixed together 40 parts of a polyester-polyol (ethylene-1,4-butanediol adipate copolymer; number-average molecular weight: 2,200), 60 parts of a polyester-polyol (ethylene-1,4-butanediol adipate copolymer; number-average molecular weight: 1,300), 11 parts of ethylene glycol as a chain extender, 1.05 parts of water as a blowing agent, 0.8 parts of triethylenediamine as a catalyst and 1 part of a silicone cell regulator, and agitated with heating to a temperature of 60° C., to give Polyol Component D.

The physical properties of Polyol Component D were determined in the same manner as in Production Example 1. The results are shown in Table 2.

TABLE 2

|  | Production Example Nos. | | | |
| --- | --- | --- | --- | --- |
|  | 1 | 2 | 3 | 4 |
| Kind of Polyester-Polyol | A | B | C | — |
| Polyol Components | | | | |
| Kind of Polyol Component | A | B | C | D |
| Acid Value (KOH mg/g) | 0.32 | 0.35 | 0.30 | 0.21 |
| Hydroxyl Value (KOH mg/g) | 247.5 | 249.6 | 247.5 | 232.0 |
| Viscosity (mPa · s) at 40° C. | 1076 | 1196 | 1081 | 1210 |
| Water Content (% by weight) | 0.92 | 0.94 | 0.91 | 0.91 |

Examples 1 to 3

An automated blending injection foaming machine (Model MU-203S, No. 6-018, manufactured by Polyurethane Engineering Co., Ltd.) was charged with each of Polyol Components A to C obtained in Production Examples 1 to 3 and an isocyanate prepolymer (trade name: "EDDY-FOAM B-2009", manufactured by Kao Corporation; NCO %: 18.5%), and the resulting mixture was allowed to be foamed under the following molding conditions to yield a polyurethane foam sheet of 10 mm×100 mm×300 mm. The Polyol Component used in each of Examples is listed in Table 3.

[Molding Conditions]

Isocyanate index: 100 to 103

Mixing temperature: Each temperature of the isocyanate prepolymer and polyol components being adjusted to 35° to 45° C.

Reaction time: Cream time: 5 to 10 seconds Silk time: 15 to 25 seconds Rise time: 35 to 60 seconds Tack free time: 30 to 55 seconds Release time from mold: 4.5 to 5.5 minutes Mold: Temperature of mold: 45° to 55° C. Mold release agent: silicone and wax Density: Free foam density: 0.12 to 0.32 g/cm³ Density of foamed article: 0.35 g/cm³

Maturing conditions: 1 week at ambient temperature

Next, as the physical properties of the urethane foam sheets obtained, hardness, tensile strength, tear strength and elongation at break were determined in accordance with the following methods. The results are shown in Table 3.

[Physical Properties of Polyurethane Foam Sheet]

Hardness (Asker C): determined according to SRIS 0101;

Tensile strength: determined according to JIS K 6301 using a dumbbell of JIS No.1;

Tear strength: determined according to JIS K 7311; and

Elongation at break: determined according to JIS K 6301 using a dumbbell of JIS No. 1.

Comparative Example 1

A polyurethane foam sheet was prepared in the same manner as in Example 1 except that Polyol Component D obtained in Production Example 4 and an isocyanate prepolymer (trade name: "EDDYFOAM B-2009", manufactured by Kao Corporation; NCO %: 18.5%) were blended together as the polyol component and the isocyanate prepolymer.

The physical properties of the polyurethane foam sheet were determined in the same manner as in Example 1. The results are shown in Table 3.

TABLE 3

|  | Example Nos. | | | Comp. Example 1 |
| --- | --- | --- | --- | --- |
|  | 1 | 2 | 3 |  |
| Kind of Polyol Component | A | B | C | D |
| Density of Foamed Article (g/cm³) | 0.35 | 0.35 | 0.35 | 0.35 |
| Hardness (Asker C) | 64 | 64 | 64 | 64 |
| Tensile Strength (kgf/cm²) | 36.9 | 35.4 | 36.8 | 34.0 |
| Tear Strength (kgf/cm) | 17.4 | 17.8 | 17.6 | 16.8 |
| Elongation at Break (%) | 380 | 380 | 390 | 380 |

It is clear from the results in Table 3 that the tensile strength of the polyurethane foam sheets obtained in Examples 1 to 3 are remarkable superior to those of Comparative Example 1, even though the density of the foamed articles is at the same level.

PREPARATION EXAMPLES 4 TO 7

Preparation of Polyester-Polyols D to G

A four-necked flask was charged with 100 parts of adipic acid, phthalic anhydride and ethylene glycol in amounts shown in Table 4, and reacted in the same manner as in Preparation Examples 1 to 3, to yield each of Polyester-Polyols D to G.

The physical properties of the resulting Polyester-Polyol D were evaluated in the same manner as in Preparation Examples 1 to 3. The results are shown in Table 4.

TABLE 4

|  | Preparation Example Nos. | | | |
| --- | --- | --- | --- | --- |
|  | 4 | 5 | 6 | 7 |
| Phthalic Anhydride (Parts) | 25.3 | 54.6 | 67.6 | 2.02 |
| Ethylene Glycol (Parts) | 57.5 | 70.8 | 76.8 | 46.9 |
| Phthalic Anhydride/Adipic Acid (Molar Ratio) | 0.25 | 0.53 | 0.67 | 0.02 |
| Polyester-Polyol |  |  |  |  |
| Kind of Polyester-Polyol | D | E | F | G |
| Acid Value (KOH mg/g) | 0.25 | 0.28 | 0.31 | 0.46 |
| Hydroxyl Value (KOH mg/g) | 51.1 | 50.9 | 50.2 | 51.3 |
| Viscosity (mPa · s) at 60° C. | 4060 | 9765 | 15860 | 1150 |
| Properties at 40° C. | Liquid | Liquid | Liquid | White Solid |
| Number-Average Molecular Weight | 2198 | 2205 | 2235 | 2187 |

PRODUCTION EXAMPLES 5 TO 9

Production of Isocyanate Prepolymers A to E

A flask was charged with 100 parts of 4,4'-diphenylmethane diisocyanate, and its temperature was kept at 60° C.

Thereto was then gradually added dropwise each of Polyester-Polyols A to E obtained in Preparation Examples 1 to 5 in an amount shown in Table 5 at 40° C. in a nitrogen gas stream while the contents of the flask were stirred. The reaction was continued for 2 hours with keeping the temperature inside the flask at 50° to 70° C.

Thereafter, to the mixture of the flask was added a carbodiimide-modifided MDI (trade-name: "CORONATE MX", manufactures by Nippen Polyurethane, Co., Ltd.) in an amount shown in Table 5, and the reaction mixture was further matured for 1 hour, to yield each of Isocyanate Prepolymers A to E having NCO % and viscosity at 60° C. as shown in Table 5.

TABLE 5

|  | Production Example Nos. | | | | |
| --- | --- | --- | --- | --- | --- |
|  | 5 | 6 | 7 | 8 | 9 |
| Polyester-Polyol | A | B | C | D | E |
| (Parts) | (64.6) | (64.6) | (72.5) | (64.6) | (64.6) |
| Carbodiimide-Modified MDI (Parts) | 58.4 | 58.4 | 11.0 | 58.4 | 58.4 |
| Isocyanate Prepolymer |  |  |  |  |  |
| Kind of Isocyanate Prepolymer | A | B | C | D | E |
| NCO % | 21.5 | 21.5 | 18.5 | 21.5 | 21.5 |
| Viscosity (mPa · s) at 60° C. | 90 | 85 | 90 | 86 | 88 |

PRODUCTION EXAMPLE 10

Production of Isocyanate Prepolymer F

The solidification point of Polyester-Polyol F obtained in Preparation Example 6 was too high, and it was difficult to add the polyester-polyol dropwise at 40° C. Therefore, it was rather difficult to prepare a prepolymer therefrom.

PRODUCTION EXAMPLE 11

Production of Isocyanate Prepolymer G

The solidification point of Polyester-Polyol G obtained in Preparation Example 7 was too high to be added dropwise at 40° C. Thus, it was impossible to handle Polyester-Polyol G in the same manner as for Polyester-Polyols A to E obtained in Preparation Examples 1 to 5.

Therefore, it was rather difficult to prepare a prepolymer using Polyester-Polyol G obtained in Preparation Example 7.

Examples 4 to 8, and

Comparative Example 2

A polyol component was obtained by mixing 100 parts of a polyester-polyol [starting monomers: ethylene glycol, diethylene glycol and adipic acid; ethylene glycol/diethylene glycol (weight ratio)=1/1; number-average molecular weight: 2,200], 11 parts of ethylene glycol; 1.05 parts of water, 0.8 parts of triethylenediamine and 1 part by weight of a silicone cell regulator.

Next, a polyurethane foam sheet was prepared by reacting the above polyol component with each of Isocyanate Prepolymers A to E obtained in Production Examples 5 to 9, or an isocyanate prepolymer (trade name: "EDDYFOAM B-2009" manufactured by Kao Corporation; NCO %: 18.5%) in the same manner as in Examples 1 to 3.

The physical properties of the polyurethane foam sheet obtained were determined in the same manner as in Examples 1 to 3. The results are shown in Table 6.

Examples 9 to 13, and

Comparative Example 3

A polyol component for foam formation was obtained by mixing 60 parts of a polyester-polyol [starting monomers: ethylene glycol, 1,4-butanediol and adipic acid; ethylene glycol/1,4-butanediol (weight ratio)=1/0.65; number-average molecular weight: 2,200], and 40 parts of a polyester-polyol (starting monomers: ethylene glycol, 1,4-butanediol and adipic acid; ethylene glycol/1,4-butanediol (weight ratio)=1/1; number-average molecular weight: 1,300], 11 parts of ethylene glycol, 1.65 parts of water, 0.8 parts of triethylenediamine and 1 part by weight of a silicone cell regulator.

Next, a polyurethane foam sheet was prepared by reacting the above polyol component with each of Isocyanate Prepolymers A to E obtained in Production Examples 5 to 9, or an isocyanate prepolymer (trade name: "EDDYFOAM B-2009" manufactured by Kao Corporation; NCO %: 18.5%) in the same manner as in Examples 1 to 3.

The physical properties of the polyurethane foam sheet obtained were determined in the same manner as in Examples 1 to 3. The results are shown in Table 6.

Those skilled in the art will recognize, or be able to ascertain using no more than routine experimentation, many equivalents to the specific embodiments of the present invention described specifically herein. Such equivalents are intended to be encompassed in the scope of the following claims.

What is claimed is:

1. A polyester-polyol being liquid at 40° C. and having a viscosity of not more than 10,000 mPa·s at 60° C., prepared by polycondensation of:

(A) an acid component comprising (i) at least one phthalic acid component selected from phthalic anhydride or o-phthalic acid, and (ii) an aliphatic polybasic acid, wherein the molar ratio of the phthalic acid component to the aliphatic polybasic acid is 0.05 to 0.2, with (B) a polyhydric alcohol.

2. The polyester-polyol according to claim 1, wherein the aliphatic polybasic acid is adipic acid.

3. The polyester-polyol according to claim 1, wherein the polyester-polyol has a number-average molecular weight of 500 to 4000.

4. The polyester-polyol according to claim 1, wherein the polyhydric alcohol is at least one compound selected from ethylene glycol and 1,4-butanediol.

5. A process for preparing a polyurethane foam comprising reacting a polyisocyanate component with a polyol

TABLE 6

| | Example Nos. | | | | | | | | | | Comp. Ex. 2 | Comp Ex. 3 |
| --- | --- | --- | --- | --- | --- | --- | --- | --- | --- | --- | --- | --- |
| | 4 | 5 | 6 | 7 | 8 | 9 | 10 | 11 | 12 | 13 | | |
| Kind of Isocyanate Prepolymer | A | B | C | D | E | A | B | C | D | E | EDDYFOAM B-2009 | EDDYFOAM B-2009 |
| Density of Foamed Article (g/cm³) | 0.35 | 0.35 | 0.35 | 0.35 | 0.35 | 0.35 | 0.35 | 0.35 | 0.35 | 0.35 | 0.35 | 0.35 |
| Hardness (Asker C) | 65 | 65 | 66 | 65 | 65 | 65 | 65 | 65 | 65 | 65 | 65 | 66 |
| Tensile strength (kgf/cm²) | 38.9 | 37.3 | 38.6 | 37.8 | 38.6 | 37.8 | 37.3 | 37.7 | 37.6 | 38.2 | 33.1 | 35.8 |
| Tear strength (kgf/cm) | 17.2 | 17.3 | 17.1 | 17.3 | 17.1 | 17.3 | 17.1 | 17.2 | 17.1 | 16.8 | 16.3 | 17.1 |
| Elongation at Break (%) | 375 | 370 | 375 | 370 | 370 | 375 | 370 | 370 | 375 | 375 | 380 | 370 |

It is clear from the results shown in Table 6 that the tensile strength of the polyurethane foam sheets obtained in Examples 4 to 13 are remarkably superior to the polyurethane foam sheets obtained in Comparative Examples 2 and 3, even though the density of the foamed articles is at the same level.

INDUSTRIAL APPLICABILITY

According to the process of the present invention, in the molding of a polyurethane foam particularly for such applications as polyurethane shoe soles, a polyurethane foam with remarkably improved physical properties such as tensile strength can be prepared while having acceptable appearance and texture even when the density is low.

Moreover, according to the process of the present invention, since the initial strength of the polyurethane foam is remarkably excellent, the process brings extremely high productivity of the polyurethane foam.

component comprising the polyester-polyol according to claim 1 to foam; to produce a polyurethane foam.

6. A process for preparing an isocyanate prepolymer which comprises reacting (a) a polyol comprising a polyester-polyol being liquid at 40° C. and having a viscosity of not more than 10,000 mPa·s at 60° C., prepared by polycondensation of (A) an acid component comprising (i) at least one phthalic acid component selected from phthalic anhydride or o-phthalic acid, and (ii) an aliphatic polybasic acid, wherein the molar ratio of the phtalic acid component to the alophatic polybasic acid is 0.05 to 0.2, with (B) a polyhydric alcohol; with (b) a polyisocyanate.

7. A process for preparing a polyurethane foam comprising reacting an isocyanate prepolymer prepared according to the process of claim 6 with a polyol component to foam; to produce a polyurethane foam.

* * * * *